Dec. 3, 1968  O. S. WILLIAMS ETAL  3,414,316
CLOSURE FOR TRACTOR CABS

Filed Oct. 13, 1966  2 Sheets-Sheet 1

INVENTORS
OSCAR STANLEY WILLIAMS,
ROBERT S. WILLIAMS,
BY
Dunn, Evans, Benedict, Swecker & Mathis
ATTORNEYS Dec. 3, 1968  O. S. WILLIAMS ETAL  3,414,316
CLOSURE FOR TRACTOR CABS
Filed Oct. 13, 1966  2 Sheets-Sheet 2
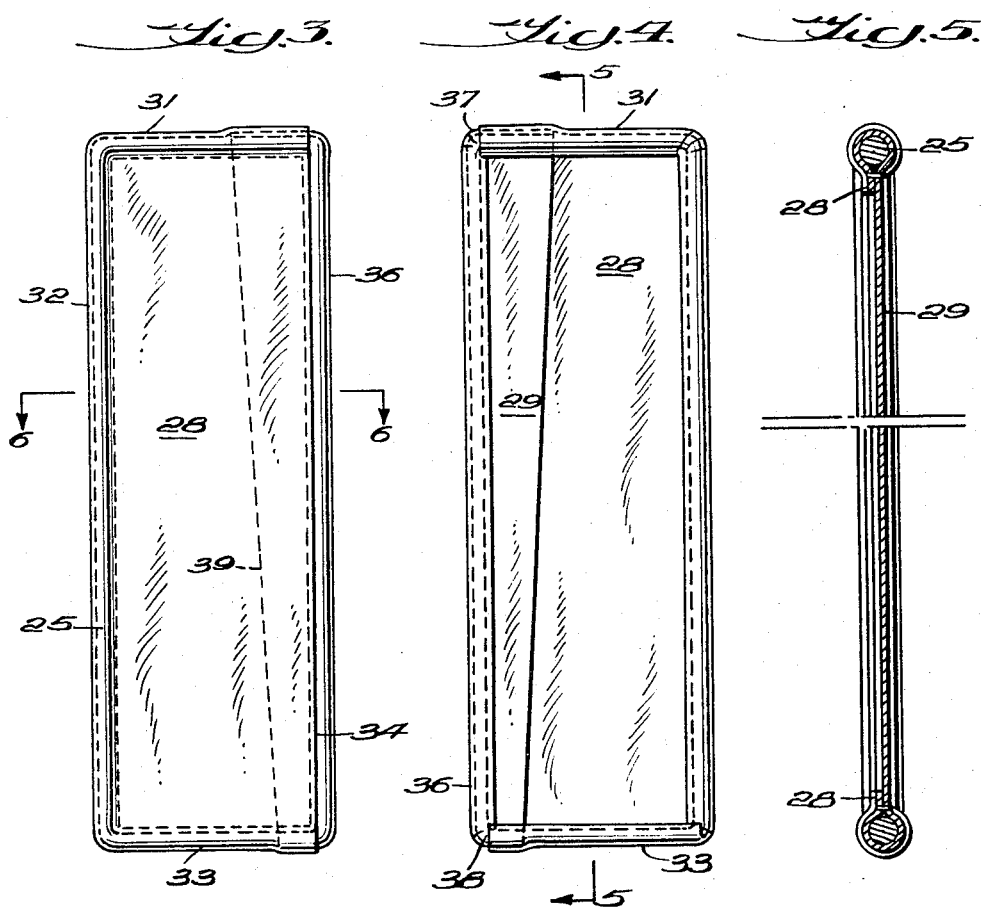
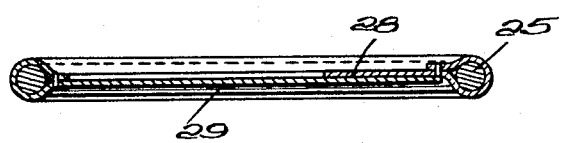
INVENTORS
OSCAR STANLEY WILLIAMS,
ROBERT S. WILLIAMS,
BY
Burns, Doane, Benedict, Swecker & Mathis
ATTORNEYS United States Patent Office 3,414,316
Patented Dec. 3, 1968

3,414,316
CLOSURE FOR TRACTOR CABS
Oscar Stanley Williams and Robert S. Williams, both of Arlington, Ind. 46104
Filed Oct. 13, 1966, Ser. No. 586,397
4 Claims. (Cl. 296—28)

ABSTRACT OF THE DISCLOSURE

A tractor cab having an opening provided in a wall thereof through which an operating lever of the tractor may extend, and closure means for the opening to permit manipulation of the lever while maintaining the opening substantially closed. The closure means is formed by two strips of flexible sheet material having edge portions which overlap each other at a corner portion of the opening, with one edge portion diverging with respect to the other so as to provide a point of minimum overlap in one position of the lever when this lever comes to rest in a normal position in the opening and yet permitting it to be manipulated to another position for operation of the tractor.

This invention relates to tractor cabs and more particularly to an improved closure for openings provided in the walls of tractor cabs.

Tractor cabs or enclosures are available for the many different varieties of farm, industrial, and garden tractors in use, including the walking types, primarily for the purpose of protecting the operator from the weather.

In addition to the weather protection that they afford, tractor cabs also protect the operator from the discomforts associated with such things as blowing or swirling snow when the tractor is utilized for clearing snow from a road, driveway, or the like. This is particularly the case when a snow thrower attachment, attached to the front of the tractor, is being operated in a high wind.

One of the major problems confronting the cab industry is that of maintaining the weathertightness of the cab or enclosure particularly when the cab is air-conditioned, either heated or cooled. This problem becomes more acute when the operator finds it necessary to operate various machine control levers or the like through openings provided in the walls of the cab or enclosure, especially in the instances when the lever is left in intersection with the cab wall while the tractor is being operated.

In some of the more common tractor cabs, such as those which comprise a tarpaulin covered frame structure secured to the tractor enclosing the operator's seat, and those which are metal covered, various types of releasable strips or flaps have been provided to close the opening when the lever is not passing through the opening and which may be partially closed about the lever when it is left extending through the cab wall. However, this type of closure and similar ones require the attention of the operator to unfasten and fasten the flap. Further, when the flap is closed about a control lever, a relatively large gap is often left in the wall, thereby reducing the weather protection capability of the cab. Such closures and others heretofore available do not have an effective self-closing feature nor do they provide minimization of the slot gap when a control lever is left extending through the cab wall, and hence have not proved to be entirely satisfactory.

Accordingly, it is a primary object of the present invention to provide a closure for tractor cabs that overcomes the limitations and disadvantages of the closures heretofore mentioned.

More specifically, it is an object of the present invention to provide a self-closing flexible closure for a tractor cab.

Another object of the instant invention is to provide a self-closing flexible closure for an opening in a cab wall that provides for minimization of the gap around a control lever which is left extending through the opening in the wall.

Still another object of this invention is to provide a self-closing flexible closure for an opening provided in a wall of a cab where the wall is fabricated either of a flexible material, such as canvas, or of a rigid material, such as sheet metal, and wherein the closure provides for minimization of the opening when a control lever or the like is to be left remaining in intersection with the cab wall.

In one embodiment of the present invention, the foregoing and other objects are attained by providing a rigid frame secured in the wall of a tractor cab about an opening provided therein for the passage of a control lever therethrough, and a pair of strips of resilient sheet material attached to the frame and having overlapping free edge portions which extend across the opening to form a closure therefor. The free edges are overlapped an unequal amount along the length of the overlapped portion in such a manner as to provide a maximum amount of overlap at the point where the lever first passes through the opening and a minimum amount of overlap at the point where the lever comes to rest extending through the opening in the wall.

The strips may be made of thin sheets of rubber or rubberized fabric, or other equivalent resilient materials in sheet form.

The proper amount of overlap of the two sheets of resilient material provides the required tension for the closure and produces a self-closing, slot-like aperture with a minimum amount of gap around the lever when it is to be left extending through the closure.

Other objects and advantages of the present invention will hereinafter become more fully apparent from the following detailed description when considered in connection with the annexed drawing in which:

FIGURE 3 is a front elevation of one embodiment of the closure and a frame therefor;

FIGURE 4 is a rear elevation of the closure and frame of FIGURE 3;

FIGURE 5 is a sectional view of the closure and frame taken along the lines 5—5 of FIGURE 4; and FIGURE 6 is a sectional view of the closure and frame taken along tthe lines 6—6 of FIGURE 3.

Figure 1:
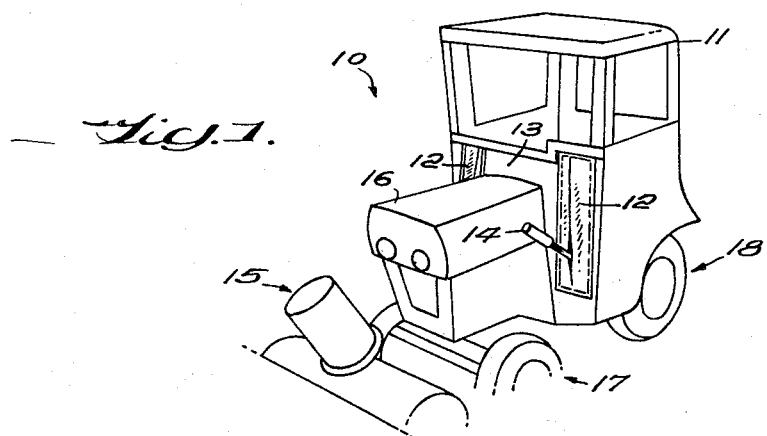
FIGURE 1 is a perspective view of a tractor equipped with a tractor cab provided with a pair of closures in the front wall thereof constructed in accordance with the teachings of the present invention.

Referring now to the drawing in more detail wherein like reference numerals represent corresponding parts throughout the several views, there is shown in FIGURE 1 a lawn and garden type tractor generally indicated by the numeral 10 provided with a weather protection cab 11. Cab 11 includes a pair of self-closing flexible closures 12 for openings formed in front wall 13 through which machine control levers or the like may be operated from inside the cab. A long handled control lever 14 is illustrated extending through one of the closures which may be operatively connected to the tractor or to an attachment such as the snow thrower 15, shown mounted on the front of tractor 10. The particular linkage from the lever 14 to the snow thrower is not shown since it is not necessary for an understanding of the present invention.

It is to be understood that the particular tractor, cab, and attachment combination illustrated in FIGURE 1 is shown by way of example only, since the closure of this invention has been found to have application with numerous other tractor and cab combinations. The details of the tractor, cab, and snow thrower form no part of the present invention, but in the example shown, tractor 10 is powered by an engine covered by a hood 16 and has a pair of front wheels generally indicated by the numeral 17 and a pair of rear driving wheels generally indicated by the numeral 18.

An operator (not shown) controls tractor 10 and snow thrower 15 from inside protective cab 11 and will have occasion to manipulate the long handled lever 14 in connection with the operation of snow thrower 15. By providing cab 11 with a self-closing flexible closure constructed in accordance with the teachings of the present invention as described in more detail below, the slot-like aperture through which lever 14 may be operated and left extending as shown will provide maximum weather tightness of the cab.

Figure 2:
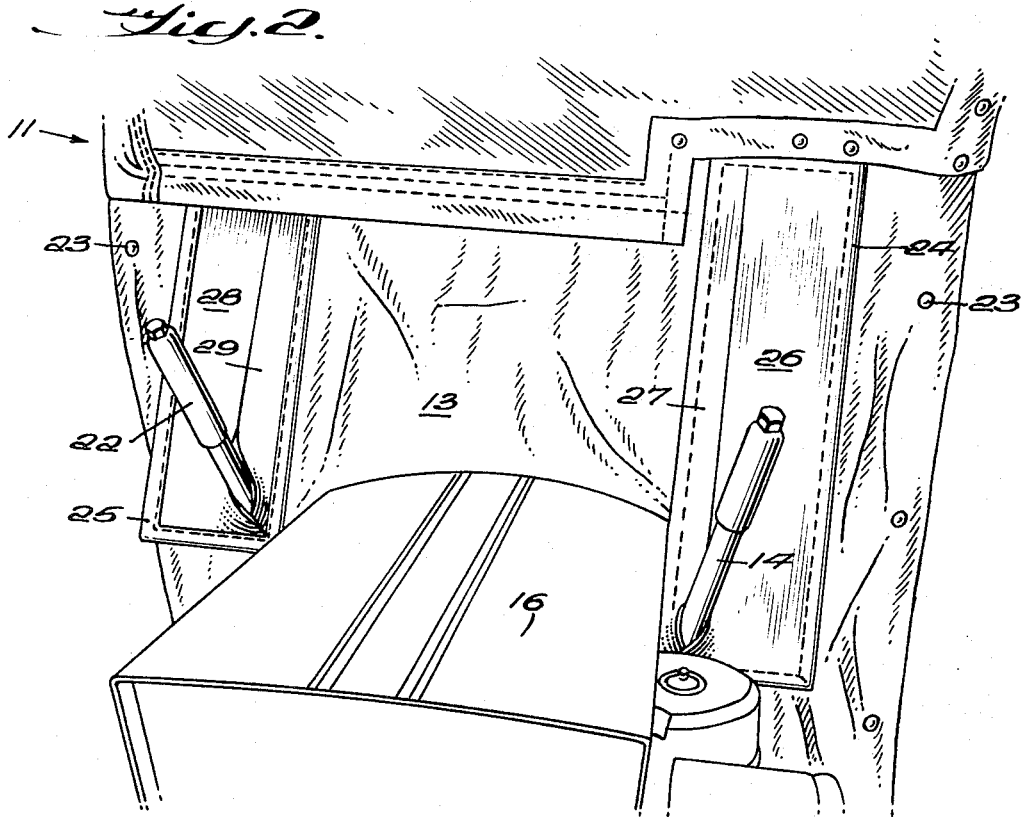
FIGURE 2 is an enlarged fragmentary view in perspective of part of the tractor and cab of FIGURE 1.

As can be more readily seen in FIGURE 2, the front curtain or wall 13 of the cab 11 has a pair of long handled levers 14 and 22 extending therethrough. Since the cab wall 13 in this instance is fabricated of a flexible covering material secured to a frame structure (now shown) by suitable fastening elements 23, rigid continuous frame members 24 and 25, illustrated with the help of the dotted lines, are secured to the wall 13 adjacent the periphery of each of the openings formed in the wall. Attached to each of the frame members 24 and 25 are a pair of strips 26, 27, and 28, 29, respectively, fabricated of thin resilient sheet material such as 1/16-inch thick rubber. One strip of each pair is substantially rectangular in shape and the other strip of each pair is trapezoidal in shape. Each strip is secured along one longitudinal edge and both transverse edges to corresponding portions of its respective frame member in such a manner as to produce an overlapping relationship between the longitudinal free edges of each pair of strips.

According to the embodiment of the closure shown in FIGURES 3–6, rectangular resilient strip 28 is secured to a rigid frame member 25 along its top edge 31, one of its longitudinal side edges 32, and along its bottom edge 33 in any convenient manner, such as by stitching. Frame member 25 is illustrated as having a circular cross section. However, it may have any other cross depending on the particular materials available. In one example, the frame 25 was constructed from a length of 3/16-inch steel rod.

The other longitudinal edge 34 of strip 28 is not fastened to frame 25 but is positioned closely adjacent and substantially parallel to the corresponding longitudinal portion of frame member 25. The trapezoidal shaped strip of resilient sheet material 29 overlies strip 28 and has one of its longitudinal edges 36 corresponding to the base of the trapezoid secured to the longitudinal portion of frame members 25 which is closely adjacent free edge 34 of strip 28. Top edge 37 and bottom edge 38 of strip 29 are secured to the top and bottom portions of frame member 25, respectively. Strip 29 is considerably smaller in area than is strip 28, and extends across frame member 25 with its inclined free edge 39 being oriented at a slight angle with respect to free edge 34 of strip 28.

Strips 28 and 29 thus overlap each other along their free edge portions 34 and 39, respectively, by an amount which varies in proportion to the distance from either the top or the bottom portion of the frame member 25. Strips 28 and 29 are preferably secured to frame member 25 in a slightly distended condition so that the free edges 34 and 39 thereof will always be under some tension.

Some of the materials from which the strips may be made are: rubber, rubberized fabric, nylon and similar plastics or blends of plastic, or any other equivalent material, preferably in sheet form that is flexible, resilient or elastic to a certain extent and which is long wearing, and highly resistant to the adverse effects of the weather.

FIGURE 3 is intended to represent the closure as it would appear from outside the cab as in FIGURE 2.

FIGURE 4 is intended to show the closure for lever 22 as it would appear to the operator of the tractor from inside the cab. In this arrangement, lever 22 would contact the closure near the top of frame 25 upon being manipulated in a forward direction by the operator, and would initially pass through the closure at the point where strips 28 and 29 have a maximum amount of overlap. As the lever would proceed through the closure in an arcuately downward direction, as would be the usual case for an attachment or implement lift lever, the amount of overlap would decrease to a minimum amount adjacent the bottom of frame 25. Lever 22 would normally rest extending through the closure closely adjacent the bottom of the frame, as shown in FIGURE 2. With this particular overlapped arrangement, the tension of the strips will be such that the gap or slot-like aperture which will exist around lever 22 formed by spreading apart the free edges of the strips will be at a minimum and thus provide the desired tightness of the cab.

By providing the maximum amount of overlap at the position where the lever would first pass through the closure and by positioning the strips so that the lever approximately follows the incline of free edge 39 of strip 29 as it is moved through the closure, the tension along the edge of each of the strips will be such as to provide for a self-closing feature throughout the movement of lever 22 as it passes through the closure.

On many types of tractors, long handled levers, such as 14 and 22, are usually pivotally connected adjacent their lower ends to the tractor and are inclined away from the tractor by a slight angle. In these situations, it has been found that the best results are obtained by having the edge of strip 29 inclined at approximately the same angle that the lever 22 is inclined with respect to the vertical.

It has also been found to be advantageous to have the plane of the closure oriented in such a manner as to be substantially perpendicular to the longitudinal axis of the lever or other control member at the point where the lever or member is to come to rest extending through the closure. With this orientation of the closure, coupled with the provision that the lever rest at the point where the strips have a minimum amount of overlap, the closure will afford a minimum gap around the lever.

Where a control lever or other control linkage member for a tractor, attachment or any other machine element is to pass through an opening formed in a rigid wall portion of a cab or enclosure, strips 28 and 29 may be fastened by any suitable securing means adjacent the periphery of the opening without the necessity of frame member 25. As long as the strips are maintained with their free edges overlapped, in the manner described above, the self-closing and minimum gap features will be assured.

The self-closing flexible closure of the present invention may be manufactured as a unit with frame member 25 and the overlapped strips 28 and 29 secured thereto in their proper relationship. This unit may then be utilized with any cab, wall, enclosure or the like for tractors and also for automobiles, boats, aircraft, etc. wherever it is important to have a self-closing flexible closure for an opening through which a member is to be passed and left positioned in intersection with the closure.

From the foregoing, it will be seen that a closure constructed in accordance with the teachings of the present invention provides a very simple and inexpensive, yet a highly desirable means for tractor cabs and the like to permit the unhampered manipulation of a machine control lever through a slot or opening provided in a wall of the cab, with a minimum amount of gap existing around the lever when it is left extending through the slot wall. It will be appreciated that before manipulating the control lever, it is not necessary for the operator to open the closure in any manner, it being simply necessary for him to move the lever against the resilient strips, whereupon the closure will yield outwardly to provide a slot-like aperture to permit the passage of the control lever therethrough. Upon withdrawing of the lever or moving it back through the closure, the outer overlapping strip, which will be under the greatest tension, will return to its initial position and will be immediately followed by the inner overlapping strip with its inclined edge, so that the desired overlap relation is attained to completely cover the opening.

While the invention has been described and illustrated for the most part with respect to one embodiment, it is recognized that variations and changes may be made therein without departing from the invention as set forth in the appended claims.

We claim:

1. In a cab for a tractor, means forming an opening in a wall of the cab for receiving a movable control lever, and closure means for said opening comprising two strips of flexible sheet material secured to said wall adjacent the periphery of said opening, and having overlapping edge portions extending across said opening, said edge portions being in diverging relation from end to end of the opening with a maximum amount of overlap between said edge portions being at the point where said lever first passes through said closure, and being at a minimum at the point where said lever comes to rest extending through said closure.

2. In the cab according to claim 1, said opening being formed by a continuous rigid frame member attached to said wall, said strips being secured to said frame member.

3. A flexible closure assembly comprising: rigid frame means defining an opening, a first strip of flexible sheet material secured to said frame means and having a free, resilient, straight edge portion extending across said opening, a second strip of flexible sheet material secured to said frame means and having a free, resilient, straight edge portion extending across said opening overlapping the edge portion of said first sheet, said straight edge portions of said strips being inclined with respect to one another at an acute angle, whereby said strips provide a self-closing, slot-like aperture when a member is passed through said closure.

4. The closure assembly according to claim 3, wherein said first strip is substantially rectangular in shape and is secured to said frame means along one longitudinal edge and along both transverse edges, and said second strip is trapezoidal in shape and is secured to said frame means along one longitudinal edge corresponding to the base of the trapezoid and along both transverse edges.

References Cited

UNITED STATES PATENTS

| | | | |
|---|---|---|---|
| 1,457,082 | 5/1923 | McCloskey | 180—90.6 |
| 1,535,045 | 4/1925 | Scheidecker | 160—180 |
| 1,840,938 | 1/1932 | Duffy | 180—90.6 |
| 2,748,854 | 1/1956 | Lynch | 160—179 |
| 2,699,826 | 1/1955 | Emerson | 160—179 |

FOREIGN PATENTS

| | | |
|---|---|---|
| 1,187,218 | 3/1959 | France. |
| 644,238 | 10/1950 | Great Britain. |

LEO FRIAGLIA, *Primary Examiner.*

J. A. PEKAR, *Assistant Examiner.*